(12) United States Patent
Li et al.

(10) Patent No.: US 10,488,681 B2
(45) Date of Patent: Nov. 26, 2019

(54) GSG TRACK-TYPE RADIO-FREQUENCY ELECTRODE, SILICON-BASED TRAVELING-WAVE ELECTRODE LIGHT MODULATOR, AND PREPARATION METHOD

(71) Applicant: WUHAN RESEARCH INSTITUTE OF POSTS AND TELECOMMUNICATIONS, Wuhan, Hubei Province (CN)

(72) Inventors: Miaofeng Li, Wuhan (CN); Xi Xiao, Wuhan (CN); Lei Wang, Wuhan (CN); Daigao Chen, Wuhan (CN); Qi Yang, Wuhan (CN); Shaohua Yu, Wuhan (CN)

(73) Assignee: WUHAN RESEARCH INSTITUTE OF POSTS AND TELECOMMUNICATIONS, Wuhan, Hubei Province (CN)

( * ) Notice: Subject to any disclaimer, the term of this patent is extended or adjusted under 35 U.S.C. 154(b) by 0 days.

(21) Appl. No.: 15/671,982

(22) Filed: Aug. 8, 2017

(65) Prior Publication Data

US 2018/0173018 A1   Jun. 21, 2018

(30) Foreign Application Priority Data

Dec. 21, 2016   (CN) .......................... 2016 1 1195833

(51) Int. Cl.
*G02F 1/03* (2006.01)
*G02F 1/01* (2006.01)

(52) U.S. Cl.
CPC ........ *G02F 1/011* (2013.01); *G02F 2201/122* (2013.01); *G02F 2201/127* (2013.01)

(58) Field of Classification Search
USPC ........................................... 385/1, 8
See application file for complete search history.

(56) References Cited

U.S. PATENT DOCUMENTS

| | | | |
|---|---|---|---|
| 6,646,776 B1* | 11/2003 | Cheung | G02F 1/2255 359/254 |
| 2008/0023804 A1* | 1/2008 | Dutta | H01L 23/66 257/664 |
| 2014/0369637 A1* | 12/2014 | Hoffmann | G02F 1/025 385/3 |

* cited by examiner

Primary Examiner — Eric Wong
(74) Attorney, Agent, or Firm — Houtteman Law LLC

(57) ABSTRACT

The present invention discloses a GSG track-type radio-frequency electrode, a silicon-based traveling-wave electrode light modulator, and a preparation method, and relates to the field of high-speed electro-optical chips. The GSG track-type radio-frequency electrode includes a GSG-type planar electrode, where a track electrode used for delaying an electric field is periodically added to one side or dual sides of the GSG-type planar electrode, and the track electrode is connected to a ground electrode of the GSG-type planar electrode. The silicon-based traveling-wave electrode light modulator includes the GSG track-type radio-frequency electrode and a conventional silicon-based traveling-wave electrode light modulator, and the GSG track-type radio-frequency electrode is connected to an active region of the silicon-based traveling-wave electrode light modulator by using through holes between electrode layers. The present invention can improve parameter design freedom of an electrode and realize effective signal parameter matching.

6 Claims, 5 Drawing Sheets

GSG TRACK-TYPE RADIO-FREQUENCY ELECTRODE, SILICON-BASED TRAVELING-WAVE ELECTRODE LIGHT MODULATOR, AND PREPARATION METHOD

TECHNICAL FIELD

The present invention relates to the field of high-speed electro-optical chips, and specifically, to a GSG track-type radio-frequency electrode, a silicon-based traveling-wave electrode light modulator, and a preparation method.

BACKGROUND

In signal transmission lines of a high speed chip and a high-speed printed circuit board, a coplanar waveguide type planar electrode structure is commonly used currently. In most cases, different planar electrode structures are used in different application scenarios according to requirements of the application scenarios, for example, a GSG-type (Ground-Signal-Ground, Ground-Signal-Ground) coplanar waveguide, a GS-type (Ground-Signal, Ground-Signal) coplanar waveguide, as shown in FIG. 1 and FIG. 2. However, in some cases, a relatively large capacitance is required for load loading an electrode, to achieve an effective modulation of an electrode resistance and a signal transmission speed. In this case, how to improve an adjustable parameter range of a radio-frequency electrode is involved.

Currently, a GSG-type electrode structure and a GS-type electrode structure are commonly used in the field of high speed chip design. In a conventional non-loaded transmission line or a low-capacitance load transmission line, effective transmission signal matching can be implemented by using the GSG-type electrode structure and the GS-type electrode structure, as shown in FIG. 1 and FIG. 2. However, with the vigorous development of silicon light technology in recent years, the load capacitance is much higher than that of a conventional transmission line load device. Therefore, it is required to find an electrode structure that can effectively adjust a transmission line parameter, and achieve effective signal matching when the load capacitance is relatively large.

At present, after making improvement, R&D personnel put forwards a GS track-type radio-frequency electrode based on a GS-type radio-frequency electrode. Referring to FIG. 3, the electrode effectively improves the design freedom, and can achieve effective adjustment of a radio-frequency signal in a case of a relatively large capacitance, thereby achieving electro-optical matching. However, there are some drawbacks in the above improved structure, for example, an electrode is required for conversion transition, and the adjustment capacity is limited when a capacitance is very large. Therefore, it is also necessary to develop an electrode that has a greater adjustment freedom and performs signal adjustment and matching with a large degree of freedom when a load capacitance is very large.

SUMMARY OF THE INVENTION

An objective of the present invention is to overcome the drawbacks in the foregoing background art, and to provide a GSG track-type radio-frequency electrode, a silicon-based traveling-wave electrode light modulator, and a preparation method, which can improve a parameter design freedom of an electrode and implement effective signal parameter matching.

The present invention provides a GSG track-type radio-frequency electrode, including a GSG-type planar electrode, where a track electrode used for delaying an electric field is periodically added to one side or dual sides of the GSG-type planar electrode, and the track electrode is connected to a ground electrode of the GSG-type planar electrode.

Based on the foregoing technical solution, the track electrode and the GSG-type planar electrode are made of a same process and material.

Based on the foregoing technical solution, a period of adding the track electrode is less than one tenth of a minimum operating wavelength.

Based on the foregoing technical solution, the period of adding the track electrode is 50 micrometers.

Based on the foregoing technical solution, a cross section of the track electrode is in a T-shaped structure.

Based on the foregoing technical solution, the track electrode and the GSG-type planar electrode are located in a same planar layer or in different planar layers of a multilayer planar electrode system.

Based on the foregoing technical solution, when the track electrode and the GSG-type planar electrode are located in different planar layers of a multilayer planar electrode system, the track electrode is connected to the GSG-type planar electrode by using through holes between electrode layers.

The present invention further provides a silicon-based traveling-wave electrode light modulator based on the GSG track-type radio-frequency electrode, where the silicon-based traveling-wave electrode light modulator includes the GSG track-type radio-frequency electrode and a conventional silicon-based traveling-wave electrode light modulator, and the GSG track-type radio-frequency electrode is connected to an active region of the silicon-based traveling-wave electrode light modulator by using through holes between electrode layers.

The present invention further provides a method for preparing the GSG track-type radio-frequency electrode, where the method includes the following steps:

S1: Calculate, by using electromagnetic simulation analysis software, geometrical dimensions of a GSG-type planar electrode in a matching case in which a resistance is 45-55 ohms;

S2: Add load to the GSG-type planar electrode, and recalculate a resistance with the added load by using the electromagnetic simulation analysis software;

S3: When the resistance with the added load is between 20 ohms and 50 ohms, determine to add a track electrode to one side of the GSG-type planar electrode; and when the resistance with the added load is between 50 ohms and 100 ohms, determine to add track electrodes to dual sides of the GSG-type planar electrode;

S4: Based on a determined electrode structure and by using the electromagnetic simulation analysis software, optimize and design a structure parameter of the track electrode, to obtain one period of unit structure design; and S5: Periodically arrange optimized unit structures in the length direction, to obtain an entire GSG track-type radio-frequency electrode.

Based on the foregoing technical solution, in step S4, when determining to add track electrodes to dual sides of the GSG-type planar electrode, sizes and shapes of the track electrodes added to the dual sides are the same or different, and can be optimized and designed separately according to a size of a load capacitance.

Compared with the prior art, advantages of the present invention are as follows:

(1) In the present invention, by means of adding a track electrode to a conventional GSG-type planar electrode, a parameter design freedom of an electrode can be greatly improved, so that an adjustable parameter range of the electrode is increased by a large margin on the basis of an existing electrode, thereby achieving effective adjustment of electrode resistance and refractive index.

(2) The GSG track-type radio-frequency electrode of the present invention can achieve effective signal parameter matching when load has a relatively large capacitance.

(3) The track electrode added by the present invention does not increase manufacturing costs or complexity of the electrode system, can be fully compatible with an existing multi-layer planar electrode processing technology, and does not bring difficulties of the processing technology.

(4) The GSG track-type radio-frequency electrode of the present invention is fully compatible with a conventional GSG electrode structure, does not require transition and conversion structure, and has excellent versatility.

DESCRIPTION OF EMBODIMENTS

The present invention will be described in detail below with reference to the accompanying drawings and specific embodiments.

Figure 4:
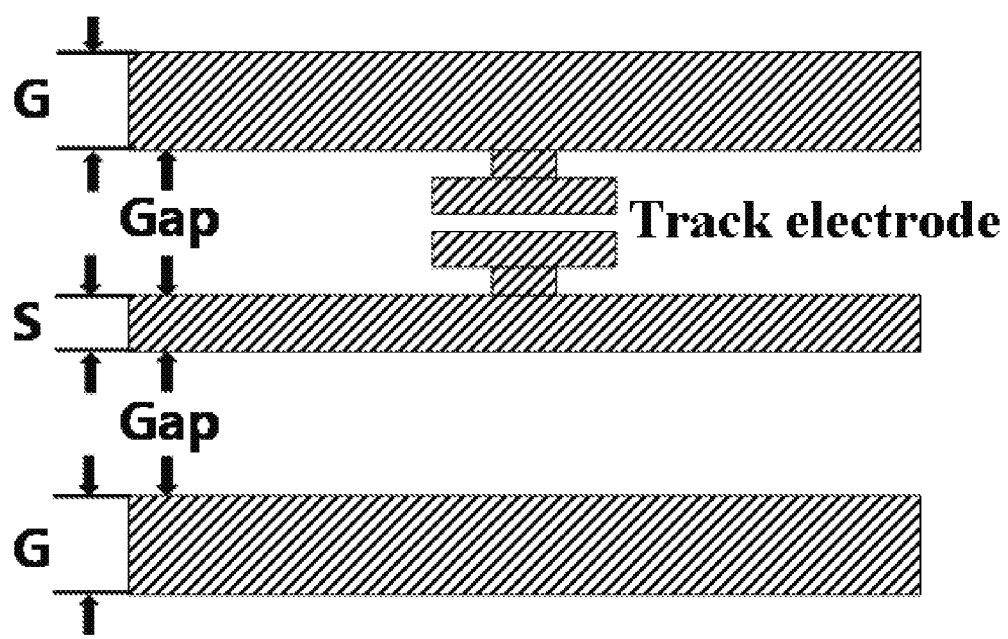
FIG. 4 is a schematic structural diagram of a periodic component of a GSG track-type planar electrode after a track electrode is added to an upper part of a ground (G) electrode according to an embodiment of the present invention.

Referring to FIG. 4, an embodiment of the present invention provides a GSG track-type radio-frequency electrode, including a GSG-type planar electrode, where a track electrode used for delaying an electric field is periodically added to one side or dual sides of the GSG-type planar electrode, the track electrode is connected to a ground (G) electrode of the GSG-type planar electrode, and the track electrode and the GSG-type planar electrode are made of a same process and material.

Figure 5:
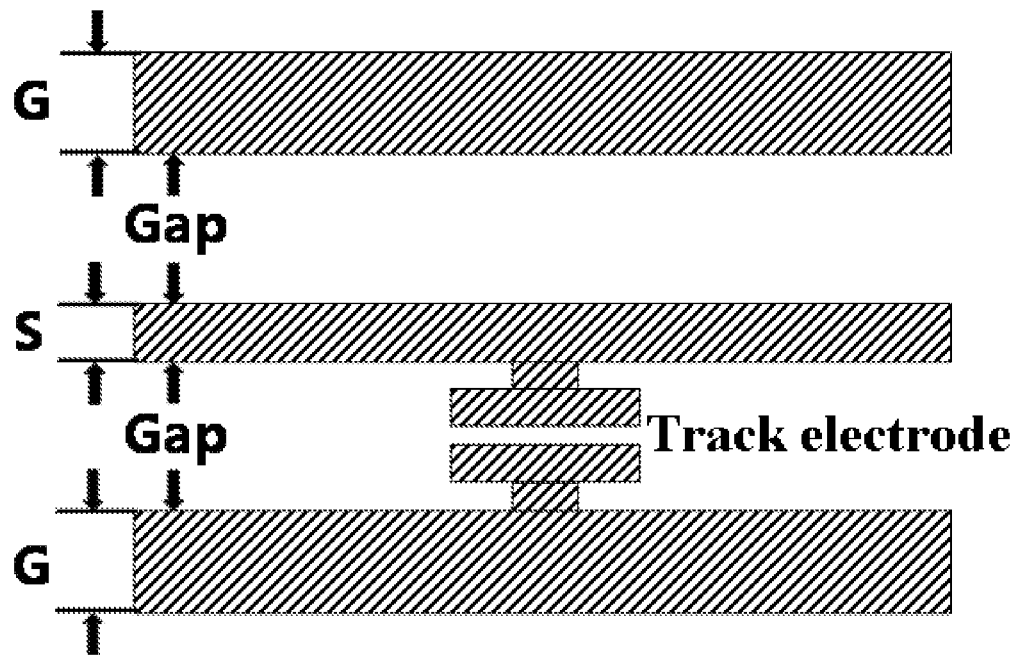
FIG. 5 is a schematic structural diagram of a periodic component of a GSG track-type planar electrode after a track electrode is added to a lower part of a ground (G) electrode according to an embodiment of the present invention.
Figure 6:
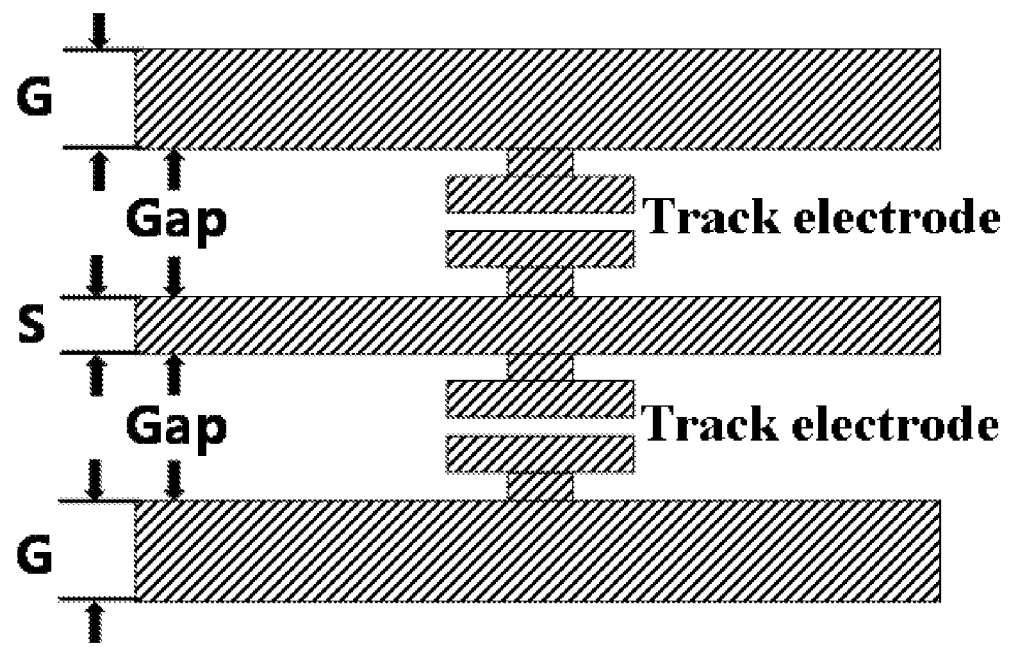
FIG. 6 is a schematic structural diagram of a periodic component of a GSG track-type planar electrode after a track electrode is added to both an upper part and a lower part of a ground (G) electrode according to an embodiment of the present invention.

Referring to FIG. 4 and FIG. 5, it is possible to add the track electrode only to one side of the GSG-type planar electrode, to the left or right, or add the track electrode to dual sides of the GSG-type planar electrode. Referring to FIG. 6, that the track electrode is added to dual sides can provide greater parameter design freedom of the electrode.

Figure 7:
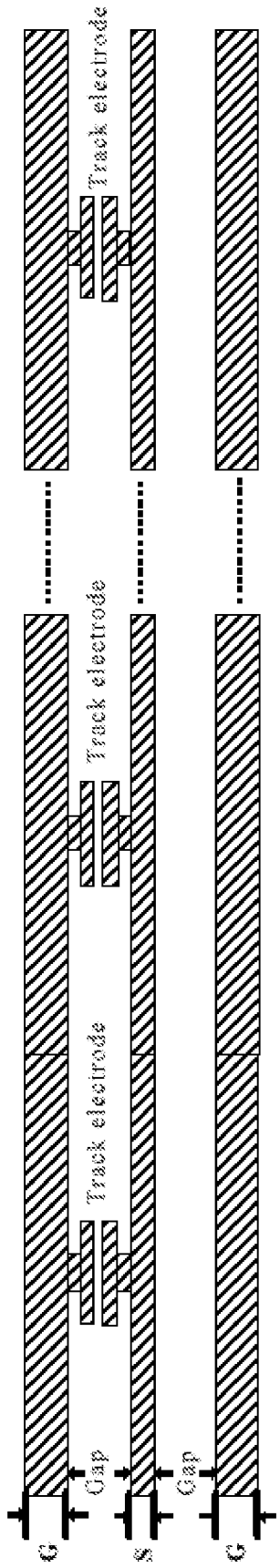
FIG. 7 is a schematic structural diagram of a whole electrode formed by multiple periods of a GSG track-type planar electrode after a track electrode is added to an upper part of a ground (G) electrode according to an embodiment of the present invention.

The GSG track-type radio-frequency electrode has a periodic structure. Referring to FIG. 7, the track electrode needs to be periodically added, and an added period is less than one tenth of a minimum operating wavelength. For a general radio-frequency circuit, the period of adding the track electrode can be selected as 50 micrometers.

A conventional GSG-type planar electrode has a same structure as that of a GSG-type planar electrode used on a common chip or circuit, and there is no difference in design and mechanism.

Referring to FIGS. 4, 5, 6, and 7, a cross section of the track electrode may be in a T-shaped structure, and the T-shaped structure is directly connected to the ground (G) electrode of the GSG-type planar electrode. In a practical project use, the T-shaped track structure can be added separately to either side of the ground (G) electrode, or simultaneously to dual sides of the ground (G) electrode.

When the track electrode is added only on either side of the ground (G) electrode, the GSG track-type radio-frequency electrode has a much larger adaptive range of load capacitance than that of a GS track-type radio-frequency electrode reported in the current literature. In a case in which the GS track-type radio-frequency electrode reported currently cannot achieve matching with a large capacitive load, the GSG track-type radio-frequency electrode can ideally achieve effective matching of radio-frequency signals.

When the track electrode is simultaneously added to dual sides of the ground (G) electrode, the GSG track-type radio-frequency electrode also has a larger adaptive range of load capacitance than that of the case in which the track electrode is added only to either side of the ground (G) electrode.

Therefore, different GSG track-type radio-frequency electrodes can be used according to different load capacitance conditions. When the load capacitance is large, the GSG track-type radio-frequency electrode in which the track electrode is added only to either side of the ground (G) electrode is used, and when the load capacitance is very large, the GSG track-type radio-frequency electrode in which the track electrode is added to dual sides of the ground (G) electrode is used.

In a practical project use, the track electrode can be modified appropriately in shape as long as it can provide an electric field delay function.

In a structure having a multilayer planar electrode system, the track electrode can be introduced into the electrode planar layers of different layers by using through holes between the different layers. In a practical project use, the track electrode and the GSG-type planar electrode may be located in a same planar layer, or may be located in different planar layers of the multilayer planar electrode system. When the track electrode and the GSG-type planar electrode are located in different planar layers of the multilayer planar electrode system, the track electrode is connected to the GSG-type planar electrode by using through holes between the electrode layers, to achieve a same function.

The track electrode needs to be optimized and designed in dimension according to specific load conditions. Taking the T-shaped track electrode as an example, a specific size of the added T-shaped track electrode needs to be electromagnetically simulated and optimized according to actual load conditions. The parameters that can be optimized include the length and width of each part of the T-shaped track electrode, four variables in total. Very large optimization design space can be obtained through the optimization of the above four parameter variables, and meanwhile, parameters of the GSG-type planar electrode provided with the T-shaped track electrode can also be added together to optimize the design, and a goal of the size optimization is to achieve effective matching of radio-frequency signals.

The GSG track-type radio-frequency electrode in the embodiment of the present invention is fully compatible with the existing GSG planar electrode circuit system and can be directly connected and transitioned to the conventional GSG planar electrode without any transition and conversion part that is between them during the connection. Compared with the GS-type track electrode, the GSG track-type radio-frequency electrode in the embodiment of the present invention has many advantages, such as simple structure, superior performance.

Figure 8:
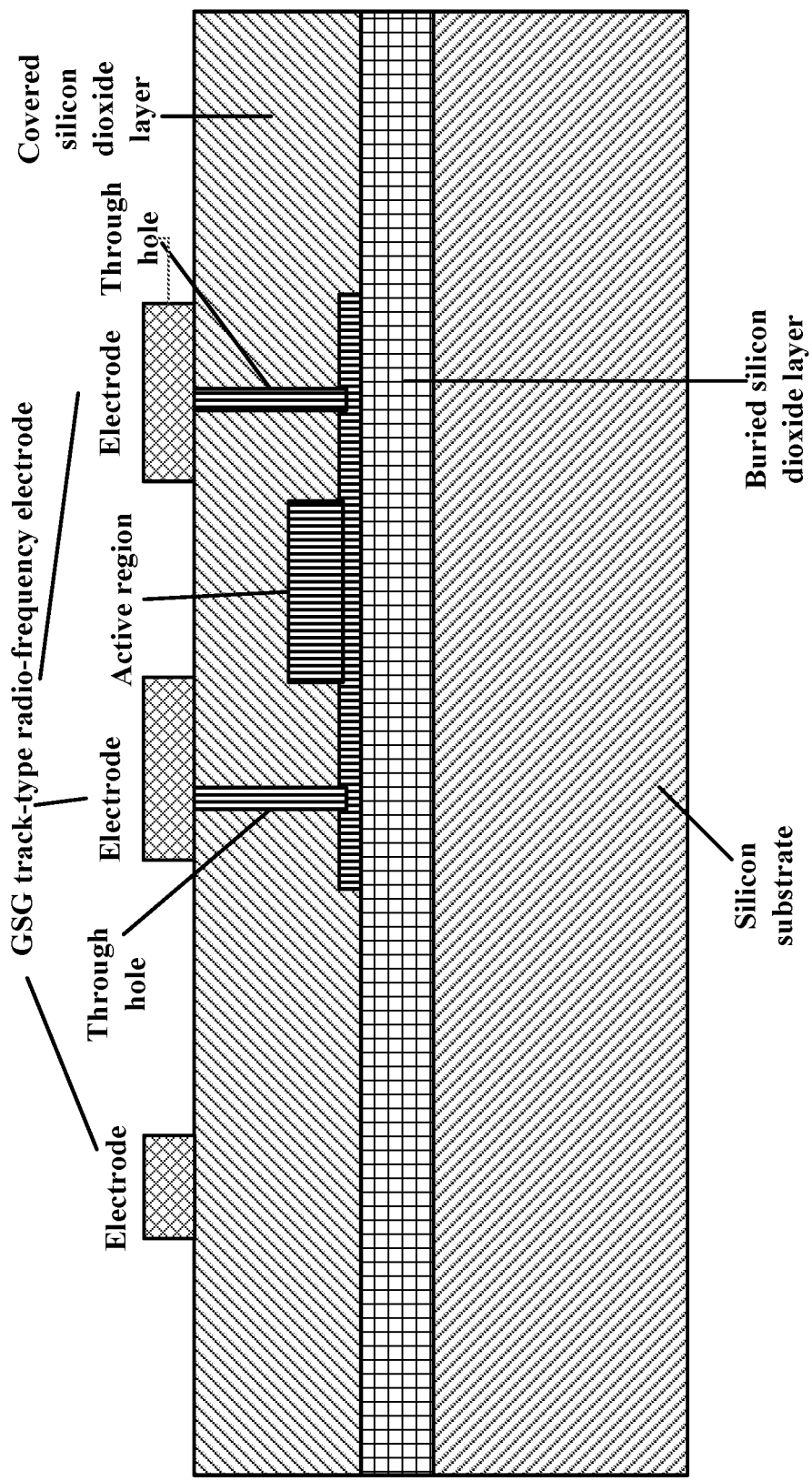
FIG. 8 is a schematic structural diagram of a silicon-based traveling-wave electrode light modulator based on a GSG track-type radio-frequency electrode according to an embodiment of the present invention.

Referring to FIG. 8, an embodiment of the present invention further provides a silicon-based traveling-wave electrode light modulator based on the GSG track-type radio-frequency electrode, where the silicon-based traveling-wave electrode light modulator includes the GSG track-type radio-frequency electrode and a conventional silicon-based traveling-wave electrode light modulator, and the GSG track-type radio-frequency electrode is connected to an active region of the silicon-based traveling-wave electrode light modulator by using through holes between electrode layers.

Figure 1:
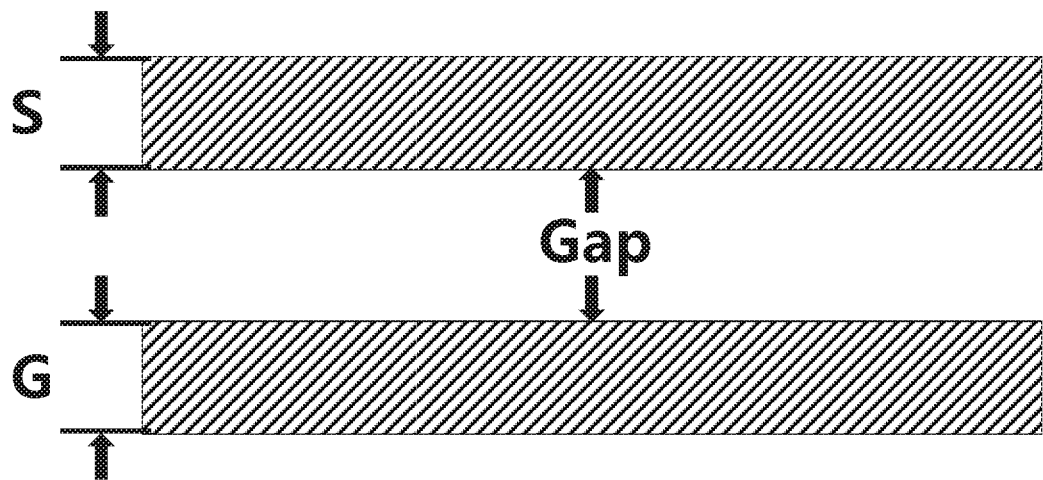
FIG. 1 is a schematic structural diagram of a conventional GS-type planar electrode.
Figure 2:
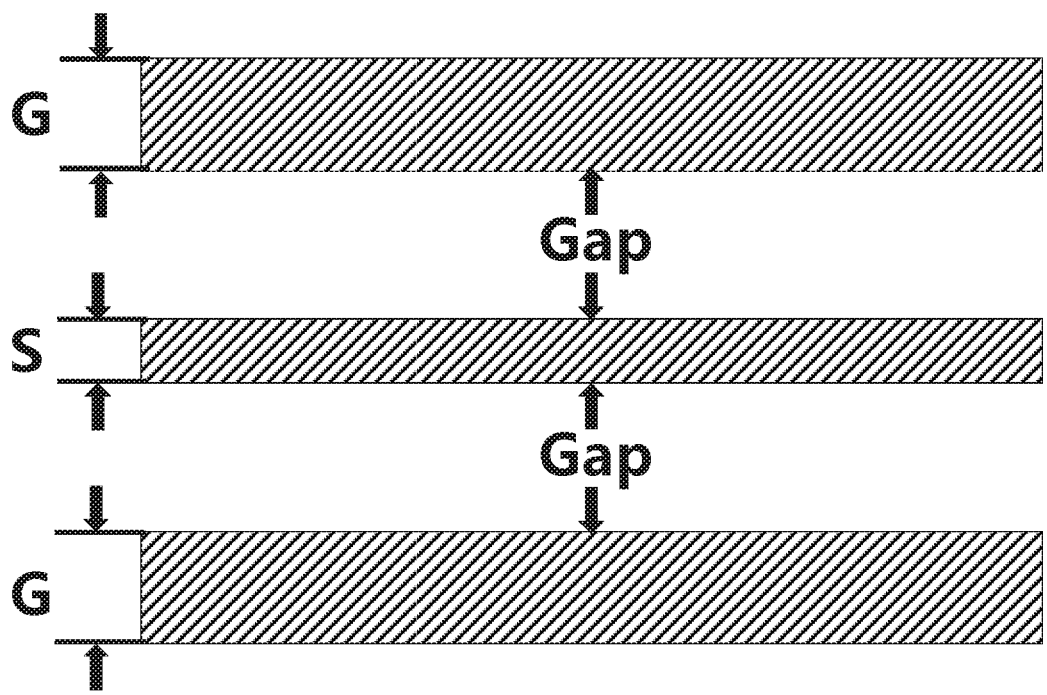
FIG. 2 is a schematic structural diagram of a conventional GSG-type planar electrode.
Figure 3:
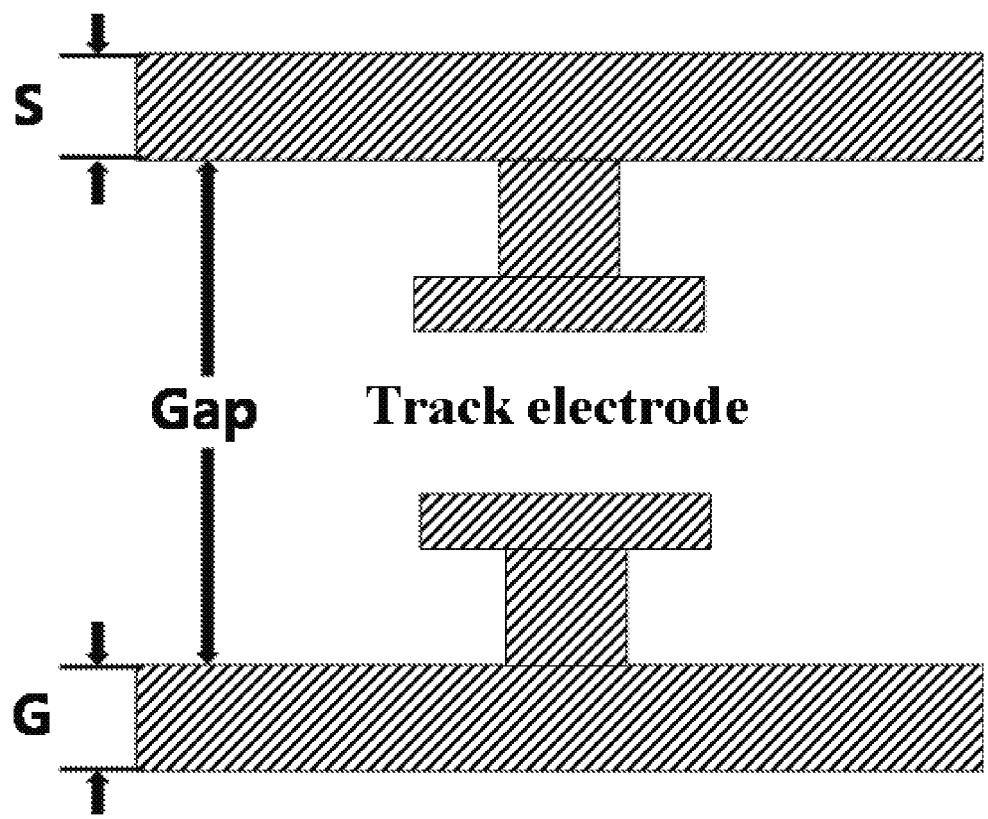
FIG. 3 is a schematic structural diagram of an existing GS track-type planar electrode.

The embodiment of the present invention further provides a method for preparing the GSG track-type radio-frequency electrode, where the method includes the following steps:

S1: Calculate, by using electromagnetic simulation analysis software, geometrical dimensions of a GSG-type planar electrode in a matching case in which a resistance is 45-55 ohms, preferably 50 ohms, as shown in FIG. 2. The specific calculation process is the existing standard scheme, and is not described herein.

S2: Add load to the GSG-type planar electrode obtained in step S1, and recalculate a resistance with the added load by using the electromagnetic simulation analysis software.

S3: After the resistance with the added load is obtained through step S2, calculate a difference between the resistance of the load and 50 ohms; If the difference is small and the resistance of the load is less than 50 ohms, in this case, the resistance of the load is generally between 20 ohms and 50 ohms, it indicates that a capacitance value of the load is small, determine to add a track electrode to one side of the GSG-type planar electrode; and if the calculated difference between the resistance of the load and 50 ohms is relatively large and the resistance of the load is greater than 50 ohms, in this case, the resistance of the load is generally between 50 ohms and 100 ohms, it indicates that a capacitance of the load is relatively large, determine to add a track electrode to dual sides of the GSG-type planar electrode.

S4: Based on the above steps, determine to use the GSG track-type radio-frequency electrode in which the track electrode is added to one side of the ground electrode, as shown in FIG. 4 and FIG. 5; or determine to use the GSG track-type radio-frequency electrode in which the track electrode is added to dual sides of the ground electrode, as shown in FIG. 6.

In this case, it is necessary to optimize and design structural parameters of the T-shaped track, mainly the length and width of each part of the T-shaped track, by using the electromagnetic field simulation analysis software and on the basis of the determined electrode structure. During the optimization process, a period of adding the track electrode is generally required to be less than one tenth of a minimum operating wavelength, and for a common circuit system, the period can be selected as 50 micrometers. Desired electrode matching parameters can be obtained through the above optimization process.

In a case of using the GSG track-type radio-frequency electrode in which the track electrode is added to one side of the ground electrode, the track electrode may be added to either side of the GSG ground electrode, as shown in FIG. 4 and FIG. 5. In a case of using the GSG track-type radio-frequency electrode in which the track electrode is added to dual sides of the ground electrode, the structure thereof is shown in FIG. 6, and meanwhile, according to the need of actual situations, sizes and shapes of the track electrodes added to the dual sides may be the same or may be different, and can be optimized and designed separately only according to a size of a load capacitance. In this way, one period of unit structure design of the GSG track-type radio-frequency electrode is completed.

S5: After the completion of the above optimization design step, the optimized unit structures are periodically arranged in the length direction, so that an entire GSG track-type radio-frequency electrode can be obtained, as shown in FIG. 7. FIG. 7 is a schematic structural diagram of the GSG track-type radio-frequency electrode in which track electrodes are added to a whole side of the ground electrode.

The optimized GSG track-type radio-frequency electrode is processed on a conventional silicon-based traveling-wave electrode light modulator, such as lithium niobate and indium phosphide modulators. Instead of the conventional GSG-type planar electrode, the GSG track-type radio-frequency electrode is connected to an active region of the lower silicon-based traveling-wave electrode light modulator by using through holes between electrode layers, that is, a silicon-based traveling-wave electrode light modulator based on the GSG track-type radio-frequency electrode is achieved. FIG. 8 is a whole schematic structural diagram of a silicon-based traveling-wave electrode light modulator based on a GSG track-type radio-frequency electrode.

The above-mentioned GSG track-type radio-frequency electrode and the silicon-based traveling-wave electrode light modulator based on the GSG track-type radio-frequency electrode are merely an embodiment of the present invention, and the present solution not only can be applicable to electrodes of chips of the silicon-based traveling-wave electrode light modulator in the embodiments, but also can be applicable to other planar and multilayer planar electrode systems, such as printed circuit boards, and are not described herein.

Various modifications and variations of the embodiments of the present invention may be made by those skilled in the art, and such modifications and variations are within the scope of the present invention if these modifications and variations are within the scope of the appended claims and the equivalents thereof.

The content not described in detail in the specification is existing technologies known to those skilled in the art.

The invention claimed is:

1. A GSG track-type radio-frequency electrode, comprising:
   a GSG-type planar electrode; and
   a plurality of track electrodes for delaying an electric field being formed separately on either side of ground electrodes or being formed simultaneously on dual sides of ground electrodes of the GSG-type planar electrode, and the plurality of track electrodes are connected to the ground electrodes of the GSG-type planar electrode, wherein an interval between each pair of adjacent track electrodes is 50 micrometers.

2. The GSG track-type radio-frequency electrode according to claim 1, wherein the track electrode and the GSG-type planar electrode are made of a same material.

3. The GSG track-type radio-frequency electrode according to claim 1, wherein a cross section of each track electrode is of a T-shaped structure.

4. The GSG track-type radio-frequency electrode according to claim 1, wherein the track electrode and the GSG-type planar electrode are located in a same planar layer or in different planar layers of a multilayer planar electrode system.

5. The GSG track-type radio-frequency electrode according to claim 4, wherein: when the track electrodes and the GSG-type planar electrode are located in different planar layers of a multilayer planar electrode system, the track electrodes are connected to the GSG-type planar electrode by using through holes between electrode layers.

6. A silicon-based traveling-wave electrode light modulator based on the GSG track-type radio-frequency electrode according to claim 1, comprising a GSG track-type radio-frequency electrode and a conventional silicon-based traveling-wave electrode light modulator, wherein the GSG track-type radio-frequency electrode is connected to an active region of the silicon-based traveling-wave electrode light modulator by using through holes between electrode layers.

* * * * *